July 11, 1961  D. D. MORTON ET AL  2,991,623
ICE FISHING ACCESSORY
Filed June 22, 1959

INVENTORS
DAMON D. MORTON
BALWANT S. GREWAL
BY
ATTORNEY

United States Patent Office 2,991,623
Patented July 11, 1961

2,991,623
ICE FISHING ACCESSORY
Damon D. Morton, 4722 Academy Ave., Dearborn, Mich., and Balwant S. Grewal, 11399 Sorrento, Detroit, Mich.
Filed June 22, 1959, Ser. No. 821,986
5 Claims. (Cl. 61—1)

This invention relates to an ice fishing accessory or device and more particularly pertains to a salt containing accessory for maintaining an ice fishing hole open during periods of the fisherman's absence.

Various means have been employed heretofore to facilitate keeping the hole opening during periods of absence, however, the several devices of the prior art have not proven entirely satisfactory inasmuch as they are complicated in design and construction, expensive to manufacture, and difficult to use.

With the foregoing in view, the primary object of the invention is to provide a device for maintaining the ice fishing hole open during periods of absence which is simple in design and construction, inexpensive to manufacture, easy to use, and effective to keep the hole open.

An object of the invention is to provide spaced concentric tubes interconnected by a bottom wall defining an annular salt crystal containing chamber for disposition in the water of the ice fishing hole to prevent same from freezing with the tube material being perforated to receive water and emit salt brine.

An object of the invention is to provide concentric rings at the top of the concentrically disposed spaced tubes for suspending the tubes.

An object of the invention is to provide upwardly extending legs having radially outwardly extending feet to support the device in an ice fishing hole with the feet contacting the ice surface.

An object of the invention is to provide means for adjusting the length of the legs so as to make the device adjustable for the thickness of the ice and the level of water in the hole.

These and other objects of the invention will become apparent by reference to the following description of an ice fishing hole device for maintaining the hole open by preventing re-freezing embodying the invention taken in connection with the accompanying drawing in which.

Figure 1:
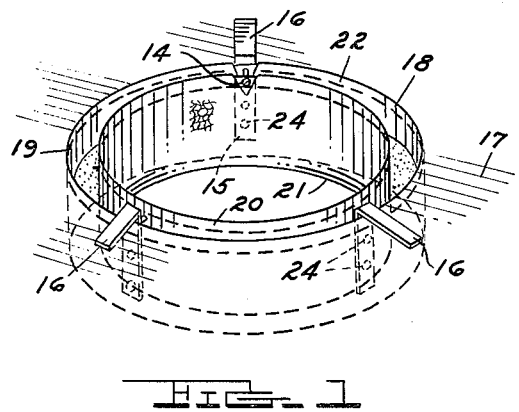
FIG. 1 is a perspective view showing the device suspended in an ice fishing hole.
Figure 2:
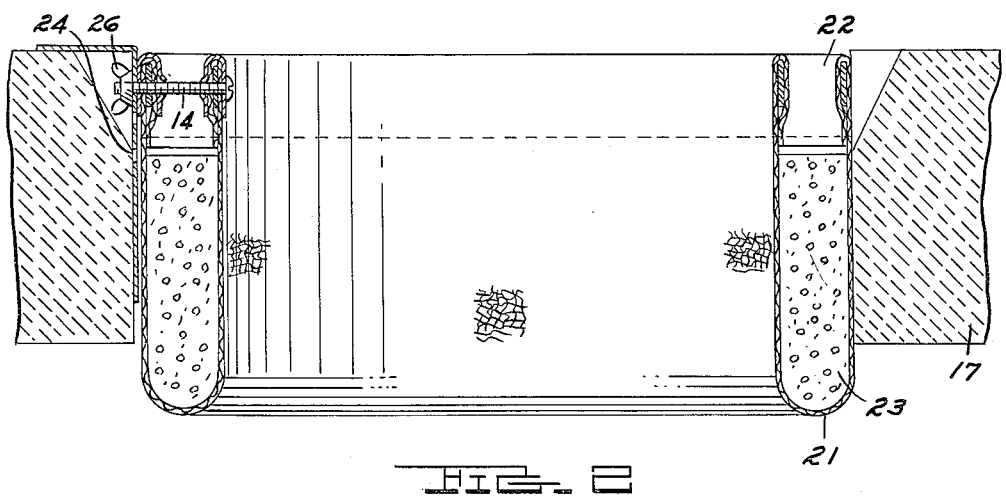
FIG. 2 is an enlarged vertical cross-sectional view of the device seen in FIG. 1.
Figure 3:
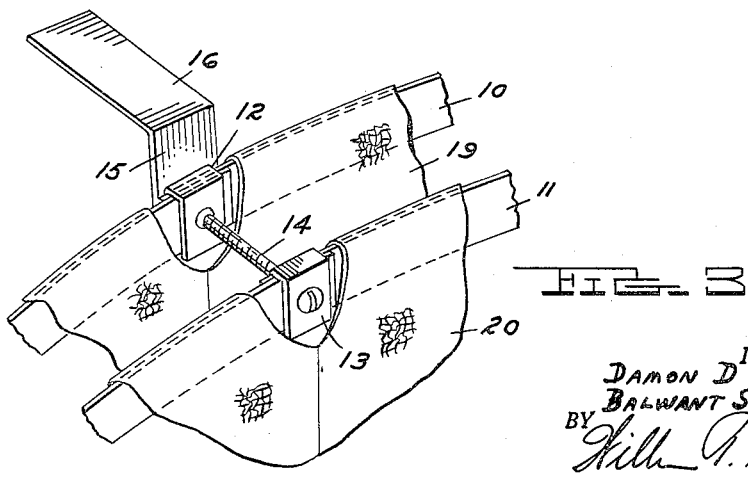
FIG. 3 is a partial perspective view of FIG. 2 showing the concentric rings and tubes, the interconnecting nuts and bolts, and the leg and radially extending foot.

Referring now to the drawing wherein like numerals refer to like and corresponding parts throughout the several views, the fishing hole anti-freezing device disclosed therein to illustrate the invention comprises in the preferred embodiment an outer annular ring 10, an inner annular ring 11 concentrically disposed within the outer ring 10 and spaced therefrom, nut-clips 12 and 13 disposed on the rings 10 and 11 respectively and a bolt leading through the rings and nuts inter-connecting them in spaced concentric relationship with the bolt 14 outer end projecting radially outwardly of the outer ring 10, a leg 15 on the outside of the ring 10 having spaced apertures formed therein with one aperture disposed over the end of the bolt 14, a wing nut 26 securing the leg to the bolt 14 against the ring 10, and radially outwardly extending feet 16 on the leg 15 for overlying the top surface of the ice 17 surrounding the hole 18.

An outer tube 19 is suspended on the outer ring 10 and depends therefrom to a bottom end, an inner tube is suspended on the inner ring 11 and depends therefrom to a bottom end, and a bottom wall 21 interconnecting the bottom ends of the tubes 19 and 20; the tubes 19 and 20 are concentrically disposed in spaced relationship and together with the bottom wall 21 form an annular salt containing chamber 22 for receiving and containing the salt 23.

In operation, the user calculates the thickness of the ice and/or level of the water in the hole and selects an aperture 24 in the legs 15 for receiving the bolt 14 and then adjusts the legs axially lengthwise by placing the selected leg hole over the bolts 14 and connecting the wing-nut 16 thereto; he then fills the annular chamber 22 with salt crystals 23 and lowers the device to the position shown in the figures so that the salt crystals are disposed within the periphery of the hole 18 and due to the fact that the tube material is perforate, preferably canvas or screening, the water in the hole enters the interior of the annular chamber 22 dissolving the salt crystals and permitting salt brine to slowly emit therefrom to prevent the water from re-freezing so as to maintain the hole 18 in an open condition during periods of absence of the fisherman.

The inventive device with the features described constitutes a compact, durable, and neat appearing accessory easily operated to prevent a hole from re-freezing and operates adequately during the fisherman's absence thereby making it unnecessary for him to re-open the hole upon his return.

Although but a single embodiment of the invention has been shown and described in detail, it is obvious that many changes may be made in the size, shape, detail, and arrangement of the various elements of the invention within the scope of the appended claims.

We claim:

1. A device insertable in a fishing hole in the ice to prevent re-freezing while the fisherman is absent comprising an outer ring, an inner ring concentrically disposed within said outer ring in spaced relationship thereto; bolts and nuts leading through and interconnecting said rings, an outer tube suspended on said outer ring and depending therefrom to a bottom end, an inner tube suspended on said inner ring and depending therefrom to a bottom end, a bottom wall interconnecting said tube bottom ends; said tubes and interconnecting bottom wall defining an open-top annular chamber for receiving and holding salt crystals; said tubes and bottom wall being perforated to receive water and to emit salt brine; legs having radially outwardly extending feet mounted on said outer ring with said feet being adapted to overlie the surface of the ice surrounding a fishing hole therein; said feet and legs being adapted to suspend said salt containing annular chamber and salt therein in the water of an ice fishing hole to prevent same from freezing.

2. In a device as set forth in claim 1, said bolts having radially projecting ends beyond said outer ring; said legs having spaced apertures adapted to receive said bolts; and wing-nuts on said bolts fastening said legs to said outer ring; said legs being lengthwise adjustable relative to said outer ring via said spaced apertures to vary the extension of said legs relative to said outer ring to adjust the level of the salt containing annular chamber relative to the thickness of the ice and the level of the water in the hole.

3. An anti-re-freezing device insertable in an ice fishing hole to maintain the hole open comprising feet for abutting the ice surface adjacent the hole, legs depending from said feet for extension into the hole, paired spaced concentric perforate annular tubes secured to said legs having bottom depending ends, and a bottom wall closing said tube's depending ends; said tubes and bottom wall defining an annular salt containing chamber.

4. A device insertable in a fishing hole in the ice to prevent re-freezing while the fisherman is absent comprising an outer tube depending to a bottom end, an inner tube depending to a bottom end, a bottom wall interconnecting said tube bottom ends; means interconnecting said tubes; said tubes and interconnecting bottom wall defining an open-top annular chamber for receiving and holding salt crystals; said tubes and bottom wall being perforate to receive water and to emit salt brine; legs having radially outwardly extending feet mounted on said means with said feet being adapted to overlie the surface of the ice surrounding a fishing hole therein; said feet and legs being adapted to suspend said salt containing annular chamber and salt therein in the water of an ice fishing hole to prevent same from re-freezing.

5. In a device as set forth in claim 4, said means having radially projecting ends beyond said outer tube; said legs having spaced apertures adapted to receive said means; and fasteners on said means fastening said legs to said outer tube; said legs being lengthwise adjustable relative to said outer tube via said spaced apertures to vary the extension of said legs relative to said outer tube to adjust the level of the salt containing annular chamber relative to the thickness of the ice and the level of the water in the hole.

References Cited in the file of this patent

UNITED STATES PATENTS

| | | |
|---|---|---|
| 2,700,649 | Hosford | Jan. 25, 1955 |
| 2,799,146 | Meagher | July 16, 1957 |

FOREIGN PATENTS

| | | |
|---|---|---|
| 178,691 | Canada | 1917 |